(12) United States Patent
Courtney, Jr. et al.

(10) Patent No.: US 8,082,514 B2
(45) Date of Patent: Dec. 20, 2011

(54) VISUAL DISPLAY OF PHYSICAL PORT LOCATION FOR INFORMATION HANDLING SYSTEM

(75) Inventors: Gerald Courtney, Jr., Austin, TX (US); Yi Zhang, Austin, TX (US); Lakshmipriya Kothandaraman, Pflugerville, TX (US); Allam Steitieh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 565 days.

(21) Appl. No.: 11/854,666

(22) Filed: Sep. 13, 2007

(65) Prior Publication Data

US 2009/0077485 A1 Mar. 19, 2009

(51) Int. Cl.
*G06F 3/14* (2006.01)
*G06F 3/17* (2006.01)

(52) U.S. Cl. ........ 715/771; 715/736; 715/855; 725/137; 701/208; 345/473; 342/357.13; 702/117

(58) Field of Classification Search .......... 715/200–277, 715/772; 700/701–799, 800–866; 345/30–111; 701/207, 208, 29; 725/137; 342/357.13; 702/108, 117, 123, 182; 713/193; 455/423
See application file for complete search history.

(56) References Cited

U.S. PATENT DOCUMENTS

| | | | |
|---|---|---|---|
| 6,412,111 B1* | 6/2002 | Cato | 725/137 |
| 7,342,587 B2* | 3/2008 | Danzig et al. | 345/473 |
| 7,366,630 B2* | 4/2008 | Vogel et al. | 702/117 |
| 7,458,037 B2* | 11/2008 | Fuchs et al. | 715/855 |
| 7,577,716 B2 | 8/2009 | Chen et al. | |
| 7,734,287 B2* | 6/2010 | Ying | 455/423 |
| 2006/0227047 A1* | 10/2006 | Rosenberg | 342/357.13 |
| 2008/0162037 A1* | 7/2008 | Hasan Mahmoud | 701/208 |
| 2008/0229208 A1* | 9/2008 | Sahashi et al. | 715/736 |
| 2008/0244459 A1* | 10/2008 | Fuchs et al. | 715/855 |

OTHER PUBLICATIONS

Cisco Systems, Inc., "Getting Started with Cisco Network Assistant", Version 1.0, Jan. 2005. pp. 2-4, 2-5, 3-2. http://www.cisco.com/en/US/docs/net_mgmt/cisco_network_assistant/version1_0/quick/guide/getstart.pdf.*

* cited by examiner

*Primary Examiner* — Ruay Ho
(74) *Attorney, Agent, or Firm* — Hamilton & Terrile, LLP; Gary W. Hamilton

(57) ABSTRACT

A system and method is provided for providing a user-interface comprising a visual display of the physical location of a plurality of I/O ports on the housing of a portable information handling system. In various embodiments, the physical location and status of the various I/O ports are shown using icons on the periphery of the display with the location of the icons on the display being correlated with the physical location of the physical ports on the housing of the portable information handling system. In some embodiments of the invention, the map is launched when the user depresses a predetermined "hot key." In other embodiments, the map is launched using other user gestures, such as executing a mouse click when the mouse pointer is positioned at a location proximate to an icon on the display or by touching a predetermined icon on a touch-sensitive screen.

12 Claims, 3 Drawing Sheets

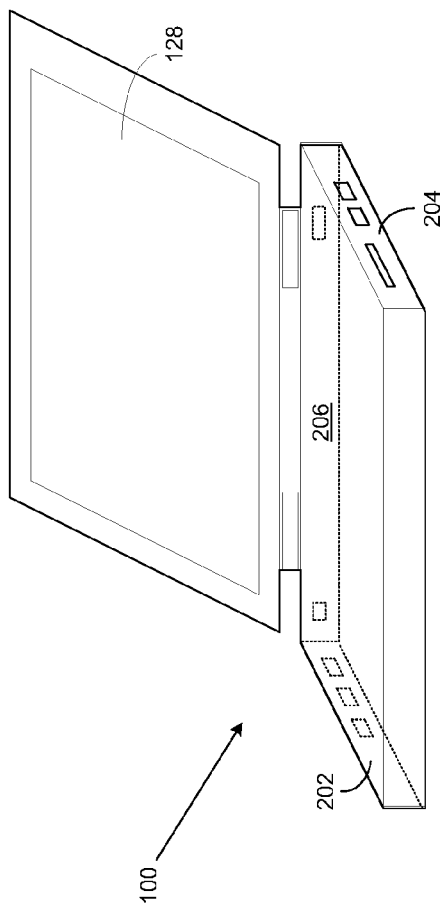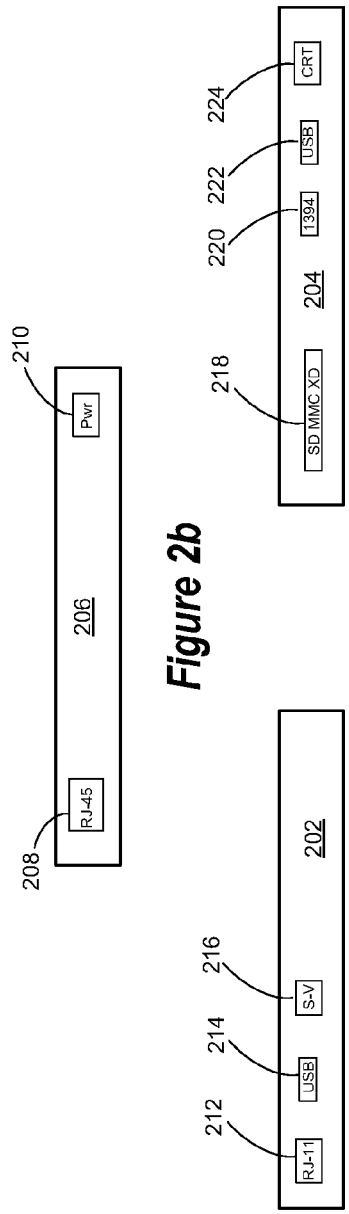

VISUAL DISPLAY OF PHYSICAL PORT LOCATION FOR INFORMATION HANDLING SYSTEM

BACKGROUND OF THE INVENTION

1. Field of the Invention

The present invention relates to the field of information handling systems, and more particularly, to a system and method for providing a visual representation of the physical location of input-output ports on an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically comprise a plurality of input-output (I/O) ports for communicating with external devices. Examples of such ports include, but are not limited to the following: system power, audio, video, serial, parallel, universal serial bus (USB) ports, RJ45 ethernet, and IEEE 1394 Firewire. Furthermore, many portable information handling systems comprise more than one port in the various categories listed above. In portable information handling systems, the aforementioned I/O ports are usually located on one of the peripheral surfaces of the system housing. Even a user who has become familiar with the same portable information handling system over an extended period of time may have difficulty locating a desired physical port. Furthermore, even if the user knows the physical location of a particular port, he may not know whether the port is enabled or whether a particular device is currently using the port. It would be desirable, therefore, to provide users with a visual map of physical location and the status of the various ports on a portable information handling system.

SUMMARY OF THE INVENTION

In accordance with the present invention, a system and method is provided for providing a user-interface comprising a visual display of the physical location of a plurality of I/O ports on the housing of a portable information handling system. In one embodiment of the invention, a "map" of the physical location of the ports is shown on a user-interface display of a portable information handling system having a "clamshell" configuration. In this embodiment, the physical location and status of the various I/O ports is shown using icons on the periphery of the display with the location of the icons on the display being correlated with the physical location of the physical ports on the housing of the portable information handling system. In another embodiment of the invention, a map of the physical location is shown on a user-interface display of a portable information handling system having a "tablet" configuration. In this embodiment, the physical location and status of the various I/O ports is also shown using icons on the periphery of the display, with the location of the icons on the display being correlated with the physical location of the physical ports on the housing of the tablet-type portable information handling system.

In some embodiments of the invention, the map is launched when the user depresses a predetermined "hot key." In other embodiments, the map is launched using other user gestures, such as executing a mouse click when the mouse pointer is positioned at a location proximate to an icon on the display or by touching a predetermined icon on a touch-sensitive screen.

In various embodiments of the invention, the status of the various ports is displayed on the user-interface. In one embodiment, the status of the various ports is displayed continuously. In another embodiment, the status of the various ports is temporarily displayed for a predetermined length of time in response to a user gesture, such as placing a mouse port over a predetermined port icon. In yet another embodiment of the invention, the port icons are displayed in "phantom" on the user interface either continuously or for a predetermined period of time.

Other embodiments and advantages of the invention will be apparent to those of skill in the art from the various figures and detailed description provided hereinbelow.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2a-d show a plurality of physical I/O ports on various surfaces of a housing for a portable information handling system.

DETAILED DESCRIPTION

Figure 1:
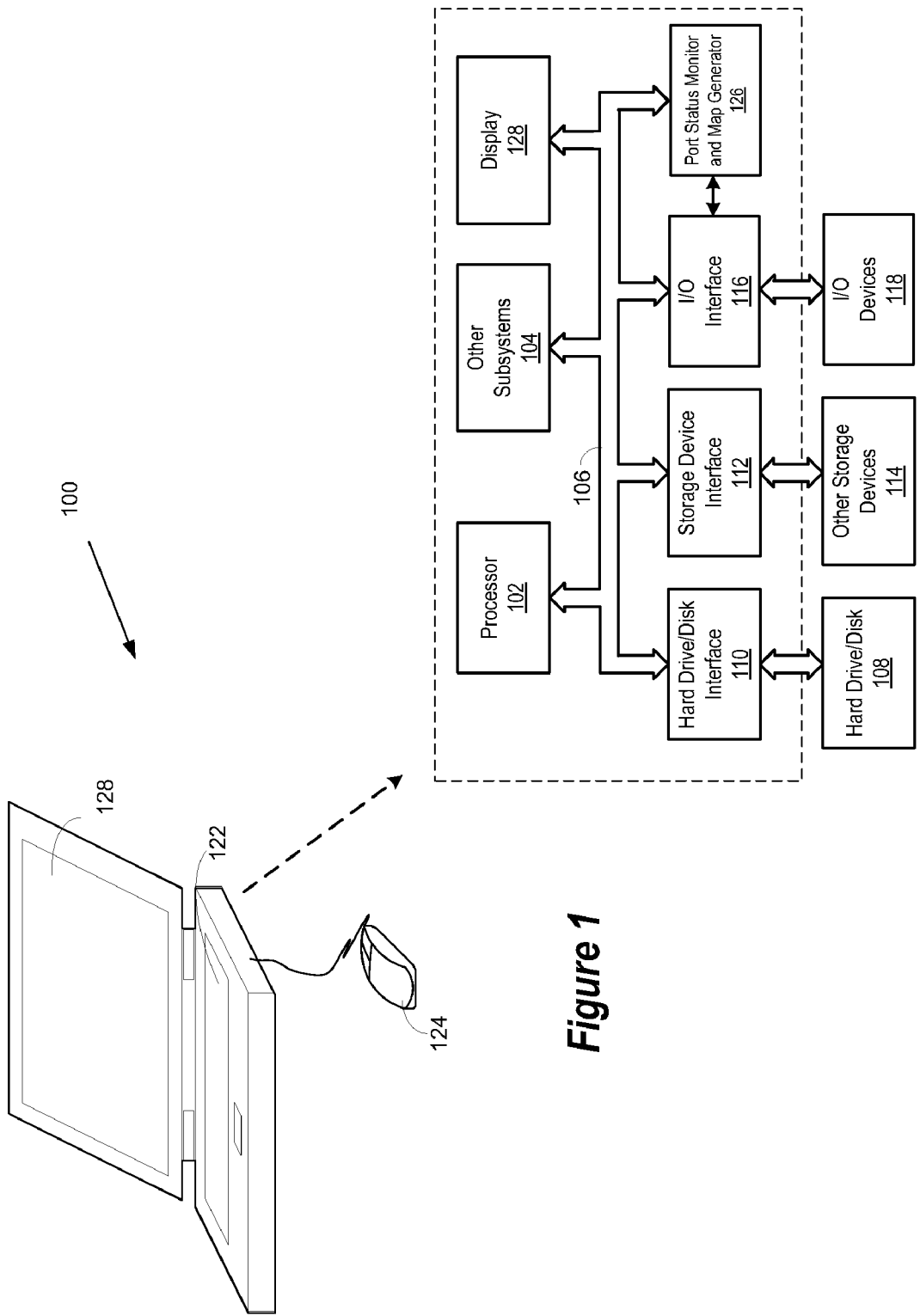
FIG. 1 is a general illustration of a portable information handling system for implementing the system and method for displaying the physical location and status of I/O ports in accordance with embodiments of the present invention.

FIG. 1 is an illustration of a portable information handling system 100 operable to provide a user-interface comprising a visual display of the physical location of a plurality of I/O ports on the housing of the portable information handling system accordance with the present invention.

For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 1, the information handling system 100 includes processor 102 and various other subsystems 104 understood by those skilled in the art. Data is transferred between the various system components via various data buses illustrated generally by bus 106. A hard drive 108 is controlled by a hard drive/disk interface 110. Data transfer between the system components and other storage devices 114 is controlled by storage device interface 112 that is operably connected to the various other storage devices 114, such as CD ROM drives, floppy drives, etc. An input/output (I/O) interface 116 controls the transfer of data between the various system components and a plurality of input/output (I/O) devices 118, such as a keyboard 122, and a mouse 124. In various embodiments of the invention, the keyboard comprises one or more function keys that can be configured as a "hot key" to initiate a predetermined operation when actuated by a user. A port status monitor and map generator 126 is operable to monitor the status of various I/O ports and to generate a map that can be displayed on display 128, as described in greater detail hereinbelow.

FIG. 2a is a general illustration of a plurality of I/O ports disposed on the side panels 202, 204 and the rear panel 206 of the housing of a portable information handling system 100. As will be understood by those of skill in the art, a wide variety of I/O ports can be placed at various locations on the information handling system and those shown in FIGS. 2a-d are representative examples for illustrating the system and method of the present invention. For example, FIG. 2b shows a RJ-45 port 208 and a power port 210 on the rear panel 206 of the portable information handling system 100. FIG. 2c shows a RJ-11 port 212, a USB port 214 and a S-Video port 216 on the side panel 202 of the information handling system. FIG. 2d shows a SD/MMC/XD memory port 218, an IEEE 1394 port 220, a USB port 222 and a CRT port 224 on the side panel 204 of the information handling system 100. For purposes of illustrating the present invention, the panel 202 will sometimes be referred to as the "left" side panel and panel 204 will sometimes be referred to as the "right" side panel.

Figure 3:
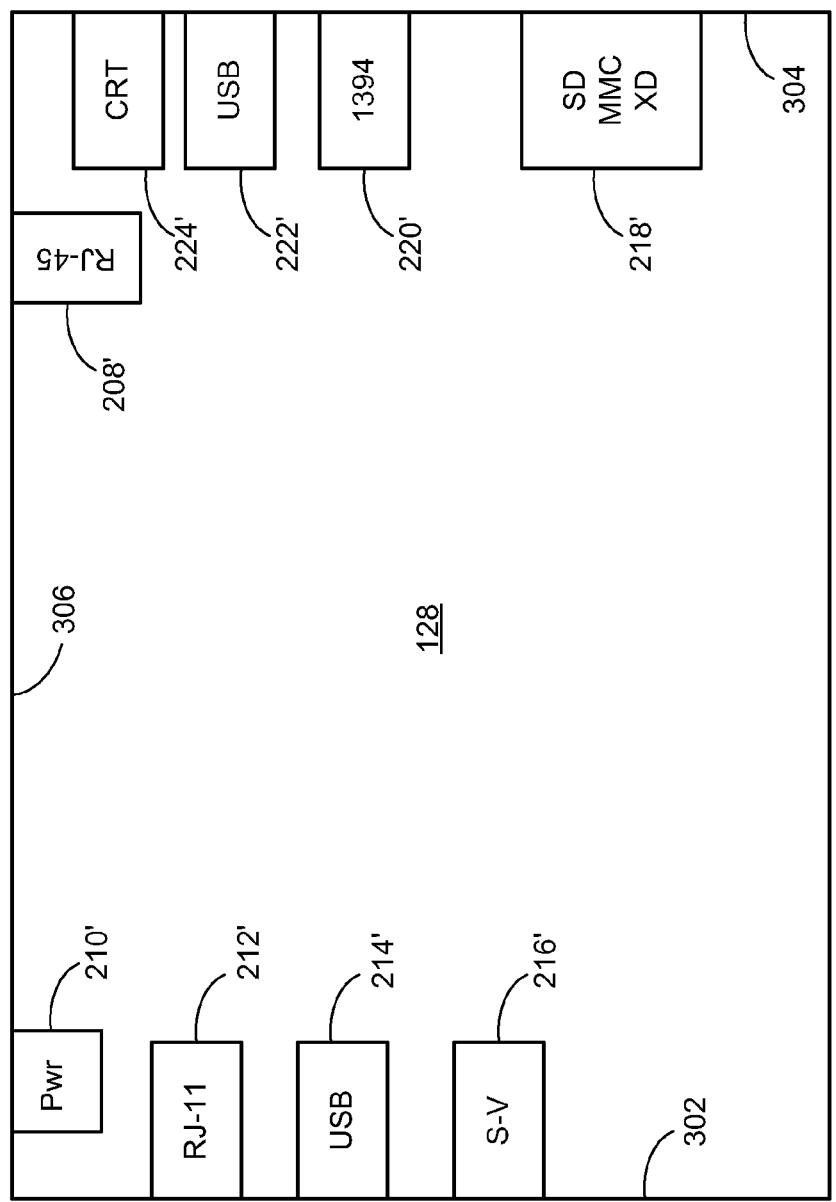
FIG. 3 is an illustration of a user-interface display showing the physical location of a plurality of I/O ports on a portable information handling system.

FIG. 3 is an illustration of the display 128 of the information handling system showing a "map" of the physical location of the various ports on the portable information handling system 100. The map comprises a plurality of icons that are located on the display 128 at predetermined positions that can be correlated with the physical location of the corresponding port on the housing of the portable information handling system 100. For example icons 212', 214', and 216' are located on the left side 302 of the display 128. These icons correspond, respectively, to the RJ-11 port 212, the USB port 214, and the S-Video port 216 on the left side panel 202 of the information handling system 100. Icons 218', 220', 222' and 224' are located on the right side 304 of the display 128. These icons correspond, respectively, to the SD/MMC/XD memory port 218, the IEEE 1394 port 220, the USB port 222 and the CRT port 224 on the right side panel 204 of the information handling system 100. Icons 208' and 210' are located at the top border 306 of the display 128. The top border 306 is correlated with the rear panel 206 of the information handling system 100. The icons 208' and 210' correspond, respectively, to the RJ-45 port 208 and the power port 210 on the rear panel 206 of the portable information handling system 100.

In one embodiment of the invention, the display 128 is configured for use with a "clamshell" style information handling system. In another embodiment of the invention, the map of the physical location is shown on a user-interface display of a portable information handling system having a "tablet" configuration. In this embodiment, the physical location and status of the various I/O ports is also shown using icons on the periphery of the display, with the location of the icons on the display being correlated with the physical location of the ports on the housing of the tablet-type portable information handling system.

In some embodiments of the invention, the map is launched when the user depresses a predetermined "hot key." In other embodiments, the map is launched using other user gestures, such as executing a mouse click when the mouse pointer is positioned at a location proximate to an icon on the display or by touching a predetermined icon on a touch-sensitive screen.

In various embodiments of the invention, the status of the various ports is displayed on the user-interface. For example the icons can be configured to display a color, e.g., "green" to indicate that the port is available. In one embodiment, the status of the various ports is displayed continuously. In another embodiment, the status of the various ports is temporarily displayed for a predetermined length of time in response to a user gesture, such as placing a mouse port over a predetermined port icon. In yet another embodiment of the invention, the port icons are displayed in "phantom" on the user interface either continuously or for a predetermined period of time. As will be understood by those of skill in the art, a "phantom" character or icon is one that is displayed in a manner to appear translucent, thereby allowing the user to see another character simultaneously at the same location on the display.

Although the present invention has been described in detail, it should be understood that various changes, substitutions and alterations can be made hereto without departing from the spirit and scope of the invention as defined by the appended claims.

What is claimed is:

1. A method for displaying a visual representation of the location of physical ports on the housing of a portable information handling system, the method comprising:
   generating a plurality of individual visual icons corresponding to the location of a plurality of physical ports on the housing of said portable information handling system; and
   displaying said individual visual icons at predetermined locations on a display, wherein the location of said individual visual icons on said display corresponds to the physical location of individual physical ports in said plurality of physical ports on the housing of said portable information handling system, and wherein said icons are displayed in phantom on said display for a predetermined period of time.

2. The method of claim 1, wherein said plurality of individual visual icons are generated in response to actuation of a predetermined key on a keyboard coupled to said portable information handling system.

3. The method of claim 1, wherein said plurality of individual visual icons are generated in response to actuation of a mouse coupled to said information handling system.

4. The method of claim 1, wherein said plurality of individual visual icons comprise information regarding the status of individual physical ports in said plurality of physical ports.

5. A system for displaying a visual representation of the location of physical ports on the housing of a portable information handling system, the system comprising:
   a plurality of physical ports located at predetermined locations on the housing of said portable information handling system;
   a display;
   data processing logic operable to generate a plurality of individual visual icons at predetermined locations on said display, wherein individual visual icons correspond to individual physical ports in said plurality of physical ports, and wherein the location of said individual visual icons on said display corresponds to the respective location of said individual physical ports in said plurality of physical ports on the housing of said portable information handling system, and wherein said icons are displayed in phantom on said display for a predetermined period of time.

6. The system of claim 5, wherein said plurality of individual visual icons are generated in response to actuation of a predetermined key on a keyboard coupled to said portable information handling system.

7. The system of claim 5, wherein said plurality of individual visual icons are generated in response to actuation of a mouse coupled to said information handling system.

8. The system of claim 5, wherein said plurality of individual visual icons comprise information regarding the status of individual physical ports in said plurality of physical ports.

9. A portable information handling system, comprising:
   a central processing unit operable to process information;
   a plurality of physical ports located at predetermined locations on the housing of said portable information handling system;
   a display;
   data processing logic operable to generate a plurality of individual visual icons at predetermined locations on said display, wherein individual visual icons correspond to individual physical ports in said plurality of physical ports, and wherein the location of said individual visual icons on said display corresponds to the respective location of said individual physical ports in said plurality of physical ports on the housing of said portable information handling system, and wherein said icons are displayed in phantom on said display for a predetermined period of time.

10. The information handling system of claim 9, wherein said plurality of individual visual icons are generated in response to actuation of a predetermined key on a keyboard coupled to said portable information handling system.

11. The information handling system of claim 9, wherein said plurality of individual visual icons are generated in response to actuation of a mouse coupled to said information handling system.

12. The information handling system of claim 9, wherein said plurality of individual visual icons comprise information regarding the status of individual physical ports in said plurality of physical ports.

* * * * *